(12) United States Patent
Soryal et al.

(10) Patent No.: US 12,058,180 B2
(45) Date of Patent: Aug. 6, 2024

(54) AUGMENTED REALITY SECURITY

(71) Applicant: AT&T Intellectual Property I, L.P., Atlanta, GA (US)

(72) Inventors: Joseph Soryal, Glendale, NY (US); Dylan Chamberlain Reid, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 481 days.

(21) Appl. No.: 17/351,589

(22) Filed: Jun. 18, 2021

(65) Prior Publication Data

US 2022/0407892 A1     Dec. 22, 2022

(51) Int. Cl.
| | |
|---|---|
| *H04L 29/06* | (2006.01) |
| *G06F 18/22* | (2023.01) |
| *G06F 21/64* | (2013.01) |
| *G06N 5/04* | (2023.01) |
| *G06N 20/00* | (2019.01) |
| *G08B 5/22* | (2006.01) |
| *H04L 9/32* | (2006.01) |
| *H04L 9/40* | (2022.01) |

(Continued)

(52) U.S. Cl.
CPC ............ *H04L 63/205* (2013.01); *G06F 18/22* (2023.01); *G06F 21/64* (2013.01); *G06N 5/04* (2013.01); *G06N 20/00* (2019.01); *G08B 5/22* (2013.01); *H04L 9/3236* (2013.01); *H04L 63/0272* (2013.01); *H04L 63/1416* (2013.01); *G06V 2201/031* (2022.01); *H04J 1/02* (2013.01); *H04L 12/4641* (2013.01)

(58) Field of Classification Search
CPC . H04L 63/205; H04L 9/3236; H04L 63/0272; H04L 63/1416; H04L 12/4641; H04L 63/0861; H04L 63/123; H04L 63/18; G06F 18/22; G06F 21/64; G06F 21/31; G06N 5/04; G06N 20/00; G08B 5/22; G06V 2201/031; H04J 1/02
See application file for complete search history.

(56) References Cited

U.S. PATENT DOCUMENTS 8,749,396 B2 *  6/2014  Maggiore ............... G06F 3/011
340/686.1
10,262,462 B2 *  4/2019  Miller ..................... G06F 3/167
(Continued)

FOREIGN PATENT DOCUMENTS

WO    WO-2017220165 A1 * 12/2017 ........... G06T 19/006

*Primary Examiner* — Mahfuzur Rahman
(74) *Attorney, Agent, or Firm* — Guntin & Gust, PLC; Mark Wilinski

(57) ABSTRACT

Augmented reality security is enabled, e.g., to prevent transmission of maliciously manipulated augmented reality data. For instance, a device can comprise a processor, and a memory that stores executable instructions that, when executed by the processor, facilitate performance of operations, comprising: based on a defined tampering criterion, determining whether a virtual frame, of a group of virtual frames received via a communication link established between the device and augmented reality equipment, has been modified without authorization, and in response to the virtual frame being determined to have been modified, causing the augmented reality equipment to stop displaying the group of virtual frames.

20 Claims, 15 Drawing Sheets

(51) Int. Cl.
*H04J 1/02* (2006.01)
*H04L 12/46* (2006.01)

(56) References Cited

U.S. PATENT DOCUMENTS

| | | | |
|---|---|---|---|
| 11,763,273 B2* | 9/2023 | Livesay | G06Q 20/3674 |
| | | | 705/39 |
| 2013/0278635 A1* | 10/2013 | Maggiore | G06F 3/0304 |
| | | | 345/633 |
| 2021/0264520 A1* | 8/2021 | Cummings | G06Q 40/12 |
| 2021/0357386 A1* | 11/2021 | Pratt | A63F 13/85 |
| 2022/0261487 A1* | 8/2022 | Lounsberry | G06F 21/6209 |
| 2022/0374847 A1* | 11/2022 | Livesay | H04L 9/50 |
| 2023/0074616 A1* | 3/2023 | Spivack | G06K 19/0723 |

* cited by examiner

US 12,058,180 B2

AUGMENTED REALITY SECURITY

TECHNICAL FIELD

The disclosed subject matter relates to augmented reality security, and more particularly, to preventing transmission of maliciously manipulated augmented reality data.

BACKGROUND

Augmented reality has applications in nearly every facet of life. In fact, augmented reality is routinely finding new, useful applications in productive contexts. For instance, AR is increasingly used in medical environments, such as surgery, as well as in automotive in applications. However, malicious manipulation of augmented reality data or augmented reality frames can be dangerous, particularly in higher risk environments. For instance, malicious manipulation of augmented reality frames during surgery could be catastrophic for a patient. Likewise, malicious manipulation of automotive augmented reality frames, such as those used for vehicle navigation, can be incredibly dangerous for a driver and passenger. Existing augmented reality systems do not adequately protect against manipulation of augmented reality frames or data.

The above-described background relating to malicious manipulation of augmented reality frames is merely intended to provide a contextual overview of some current issues, and is not intended to be exhaustive. Other contextual information may become further apparent upon review of the following detailed description.

DETAILED DESCRIPTION

Figure 1:
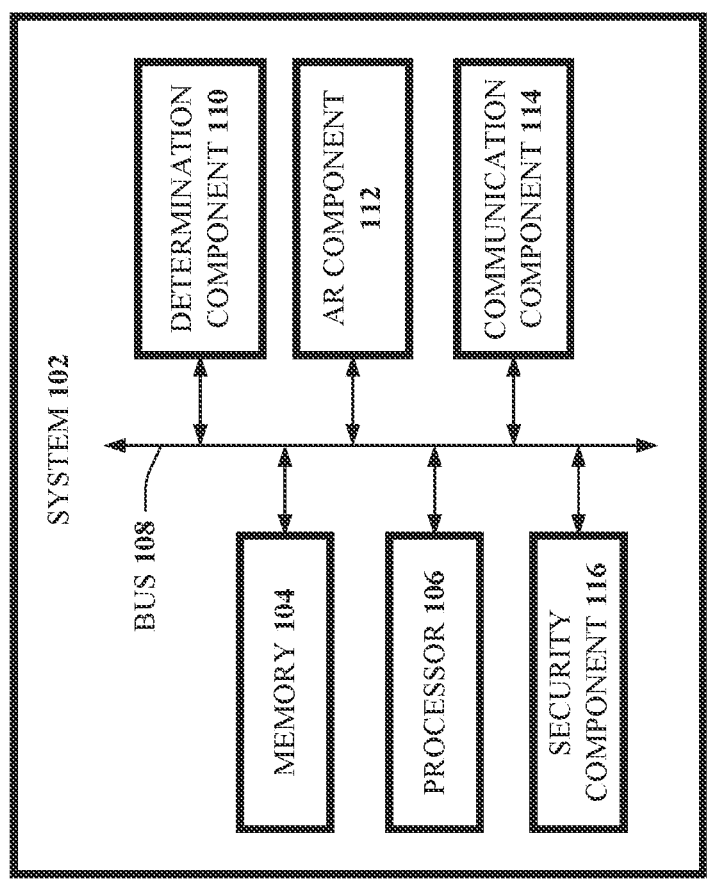
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, there exists a need for improved prevention of transmission of maliciously manipulated augmented reality frames or data, and various embodiments are described herein to this end and/or other ends. According to an embodiment, a device can comprise: a processor; and a memory that stores executable instructions that, when executed by the processor, facilitate performance of operations, comprising: based on a defined tampering criterion, determining whether a virtual frame, of a group of virtual frames received via a communication link established between the device and augmented reality equipment, has been modified without authorization; and in response to the virtual frame being determined to have been modified, causing the augmented reality equipment to stop displaying the group of virtual frames.

In some embodiments, the above operations can further comprise: in response to a determination that the virtual frame has been tampered with based on the defined tampering criterion, generating an alarm signal.

In various embodiments, the defined tampering criterion can be evaluated based on a result of a checksum process applied to the virtual frame.

In one or more embodiments, the communication link can be a first communication link, and causing the augmented reality equipment to stop displaying the group of virtual frames can comprise a signal being communicated via a second communication link established between the device and the augmented reality equipment.

It is noted that, in one or more embodiments, information represented in the signal can comprise hashed information.

It is also noted that the second communication link can comprise a virtual private network connection.

In some embodiments, the first communication link can comprise a first optical wavelength and the second communication link can comprise a second optical wavelength different from the first optical wavelength.

In various embodiments, the first communication link can comprise a first channel in a frequency division multiplexing communication link and the second communication link can comprise a second channel in the frequency division multiplexing communication link.

In another embodiment, a non-transitory machine-readable medium can comprise executable instructions that, when executed by a processor, facilitate performance of operations, comprising: receiving a virtual frame of a group of virtual frames via a communication link established with augmented reality equipment; determining, based on a defined tampering criterion established using machine learning based on previous analysis of previous virtual frames from prior to receiving the virtual frame, whether the virtual frame has been modified without authorization; and in response to the virtual frame being determined to have been modified, transmitting, via the communication link to the augmented reality equipment, warning information comprising a warning associated with the virtual frame.

It is noted that, in various embodiments, the augmented reality equipment can comprise medical augmented reality equipment, and the defined tampering criterion can be associated with a clinical operation and is satisfied in response to the virtual frame being determined to comprise a threshold similarity to a tampered virtual frame based on the previous analysis of the previous virtual frames using a defined similarity function.

In some embodiments, the group of virtual frames can comprise virtual layers associated with the clinical operation, and the clinical operation can comprise a surgical operation.

In one or more embodiments, the defined tampering criterion can comprise an organ type criterion associated with a clinical operation, the defined tampering criterion can be satisfied in response to the virtual frame being determined to comprise an organ depiction corresponding to an organ, and the organ depiction can be determined not to threshold match the organ according to an organ matching metric.

In various embodiments, the augmented reality equipment can comprise automotive augmented reality equipment, the defined tampering criterion can be associated with a vehicle navigation operation, and the defined tampering criterion can be satisfied in response to the virtual frame being determined not to threshold match a non-virtual frame corresponding to the virtual frame.

In an embodiment, the virtual frame can comprise a vehicle routing instruction that, when rendered, indicates a routing suggestion to alter a current route associated with a vehicle associated with the augmented reality equipment.

In yet another embodiment, a method can comprise: on behalf of augmented reality equipment enabled for use in association with a user identity, accessing, by a device comprising a processor, biometric information associated with the user identity for the use of the augmented reality equipment; during the use of the augmented reality equipment, determining, by the device, whether the biometric information comprises an irregularity based on a comparison of the biometric information with threshold biometric information comprising a threshold value associated with normal organ activity corresponding to the user identity; and in response to the biometric information being determined to comprise the irregularity, discontinuing, by the device, display of virtual frames in the augmented reality equipment.

In some embodiments, the method can further comprise: generating, by the device, an alarm signal associated with the irregularity.

In one or more embodiments, the method can further comprise: determining, by the device, the normal organ activity corresponding to the user identity using machine learning based on previous organ activity of previous data associated with the user identity from prior to accessing the biometric information.

In various embodiments, the augmented reality equipment can comprise surgical augmented reality equipment associated with supplementing a rendering of a surgical environment with augmented surgical information.

It is noted that, in some embodiments, the method can further comprise: determining, by the device, a critical activity associated with a use of the augmented reality equipment, wherein the critical activity is determined to threshold satisfy an activity criterion, and wherein the activity criterion is determined using machine learning based on previous activities of previous data from prior to accessing the biometric information; and in response to determining the critical activity, modifying, by the device, the threshold biometric information during the critical activity.

In one or more embodiments, modifying the threshold biometric information can comprise increasing the threshold value associated with normal organ activity corresponding to the user identity, resulting in an increased threshold value that is beyond a range of values applicable to the normal organ activity corresponding to the user identity.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can be configured to perform various operations relating to augmented reality security. The system 102 can comprise one or more of a variety of components, such as memory 104, processor 106, bus 108, determination component 110, augmented reality (AR) component 112, communication component 114, and/or security component 116.

In various embodiments, one or more of the memory 104, processor 106, bus 108, determination component 110, AR component 112, communication component 114, and/or security component 116 can be communicatively or operably coupled (e.g., over a bus or wireless network) to one another to perform one or more functions of the system 102.

According to an embodiment, the determination component 110 can, for instance, determine whether a virtual frame (e.g., of a group of virtual frames) received via a communication link (e.g., using a communication component 114) established between the system 102 and augmented reality equipment (e.g., AR component 112 and/or augmented realty equipment 704 as later discussed in greater detail), has been modified without authorization (e.g., based on a defined tampering criterion). In this regard, a security component 116 can hash an augmented reality frame (e.g., into four or five bits). The communication component 114 can, for instance, transmit the hashed augmented reality frames to AR equipment (e.g., AR component 112 and/or augmented realty equipment 704) communicatively coupled to the system 102 (e.g., using the communication component 114).

According to an embodiment, the system 102 can comprise the AR equipment (e.g., AR component 112). In this regard, the defined tampering criterion can be associated with frames hashed by the security component 116 not matching an expected hashed frame received, for instance, by the AR component 112 (e.g., via the communication component 114). According to an embodiment, in response to a virtual frame being determined to have been modified (e.g., according to the defined tampering criterion), AR component 112 can stop displaying a group of virtual frames. In an embodiment, the defined tampering criterion can be evaluated based on a result of a checksum process applied to the virtual frame.

According to an embodiment, a communication link herein (e.g., as facilitated by the communication component 114) can comprise a first communication link. In this regard, the communication component 114 can facilitate a second communication link, separate from the first communication link. In other embodiments, such a communication link herein can comprise the first communication link and the second communication, each as sub-communication links.

In an embodiment, the communication link can be a first communication link, and causing the augmented reality equipment to stop displaying the group of virtual frames can comprise a signal being communicated via a second communication link established between the device and the augmented reality equipment. It is noted that the first communication link can comprise a wireless connection for security checks (e.g., a light wireless connection) and the second communication link can comprise a wireless connection for virtual layer feeds (e.g., high-capacity communication).

According to an embodiment, the second communication link can comprise a virtual private network (VPN) connection. In further embodiments, the first communication link can comprise a VPN connection.

In another embodiment, the first communication link can comprise a first optical wavelength, and the second communication link can comprise a second optical wavelength, different from the first optical wavelength. The foregoing can improve the security of such transmission of AR frames (e.g., by preventing a "man in the middle" attack). In yet another embodiment, the first communication link can comprise a first channel in a frequency division multiplexing communication link and the second communication link can comprise a second channel in the frequency division multiplexing communication link.

According to an embodiment, the system 102 (e.g., communication component 114) can possess the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, global system for mobile communications ("GSM"), code-division multiple access ("CDMA"), satellite, visual cues, radio waves, etc.)

Figure 2:
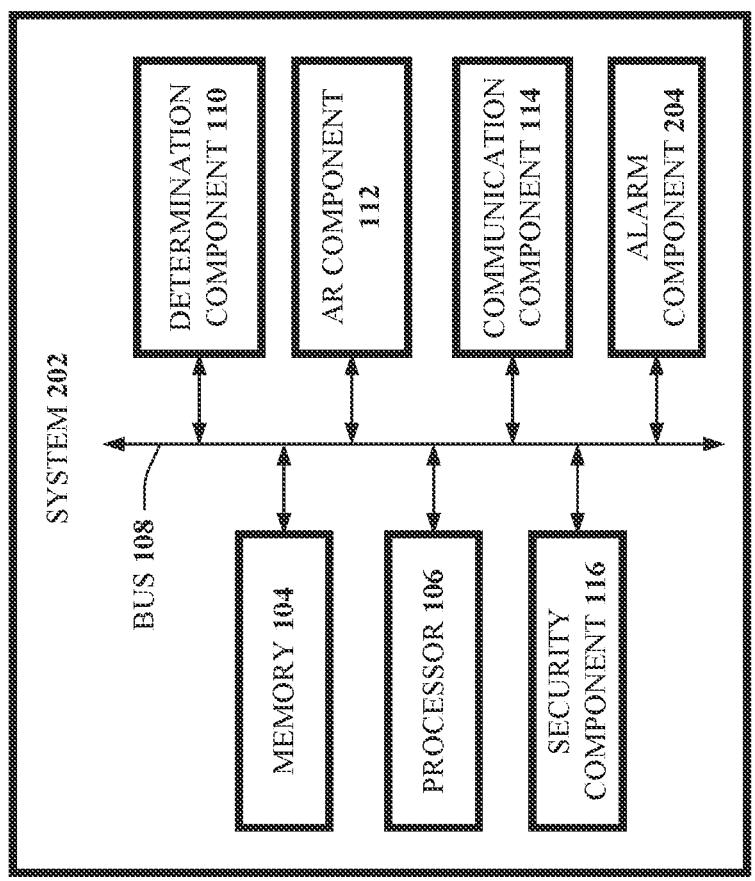
FIG. 2 is a block diagram of an exemplary system in accordance with one or more embodiments described herein.

Turning now to FIG. 2, there is illustrated an example, non-limiting system 202 in accordance with one or more embodiments herein. System 202 can be configured to perform various operations relating to augmented reality security. The system 202 can be similar to system 102, and can comprise one or more of a variety of components, such as memory 104, processor 106, bus 108, determination component 110, AR component 112, communication component 114, and/or security component 116. The system 202 can additionally comprise an alarm component 204.

In various embodiments, one or more of the memory 104, processor 106, bus 108, determination component 110, AR component 112, communication component 114, security component 116, and/or alarm component 204 can be communicatively or operably coupled (e.g., over a bus or wireless network) to one another to perform one or more functions of the system 202.

According to an embodiment, the alarm component 204 can, for instance, generate an alarm signal in response to a determination (e.g., by the determination component 110) that a virtual frame has been tampered with based on the defined tampering criterion. In other embodiments, the alarm component can cause the communication component 114 to transmit (e.g., via a communication link to the AR component 112) warning information comprising a warning associated with a virtual frame in response to the virtual frame being determined to have been modified (e.g., without authorization). Alarm signals herein can comprise audio signals, visual signals, or other suitable signals. For instance, the alarm component 204 can cause the AR component 112 or augmented reality equipment 704 to display a visual warning. In other embodiments, the alarm component 204 can cause the AR component 112, augmented reality equipment 704, or another component or connected device to generate an audible alarm signal representative of a warning.

Figure 3:
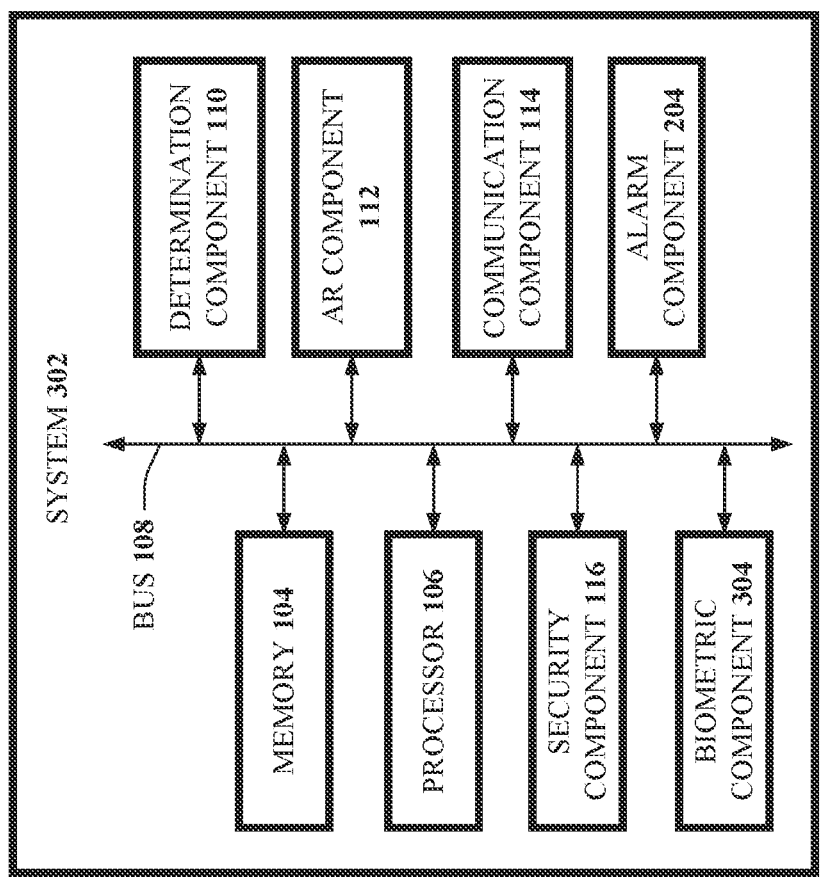
FIG. 3 is a block diagram of an exemplary system in accordance with one or more embodiments described herein.

Turning now to FIG. 3, there is illustrated an example, non-limiting system 302 in accordance with one or more embodiments herein. System 302 can be configured to perform various operations relating to augmented reality security. The system 302 can be similar to system 202, and can comprise one or more of a variety of components, such as memory 104, processor 106, bus 108, determination component 110, AR component 112, communication component 114, security component 116, and/or alarm component 204. The system 302 can additionally comprise a biometric component 304.

In various embodiments, one or more of the memory 104, processor 106, bus 108, determination component 110, AR component 112, communication component 114, security component 116, alarm component 204, and/or biometric component 304 can be communicatively or operably coupled (e.g., over a bus or wireless network) to one another to perform one or more functions of the system 302.

According to an embodiment, the biometric component 304 can, for instance, determine normal organ activity corresponding to a user identity (e.g., using machine learning as later discussed in greater detail) based on previous organ activity of previous data associated with the user identity from prior to accessing the biometric information. In this regard, the biometric component can utilize the machine learning (ML) component 504 (later discussed in greater detail). In this regard, user identities can be stored (e.g., by the biometric component 304 in the memory 104). Such user identities can comprise baseline biometric information (e.g., heartrate, eye movement, sweat gland activity, brain waves, breathing, muscle contraction, temperature, and/or other suitable biometric information). It is noted that the biometric component 304 can comprise the hardware (e.g., suitable sensors) required to gather such biometric information (e.g., biofeedback). In this regard, the biometric component 304 can determine normal organ activity of a user associated with a user identity and store such normal organ activity as a profile and utilize such normal activity to generate threshold values associated with said normal activity. Further in this regard and according to an example, the biometric component 304 (and/or the ML component 504) can determine normal eye movement, eye position, or other suitable eye characteristics. It is further noted that such baseline biometric information can be associated with defined objective normal activity (e.g., according to surgical standards). In this regard, individualized normal user activity can be combined with defined objective normal activity in the generation of a user profile. It is also noted that user profiles (e.g., comprising normal biometric activity) can be modified over time (e.g., by the biometric component 304) in response to observed changes in behaviors over time of respective users. The biometric component 304 can then determine deviations from such normal activity based on a comparison to such threshold values. In this regard, the biometric component 304 can, during the use of augmented reality equipment (e.g., augmented reality equipment 704 and/or AR component 112), determine whether the biometric information comprises an irregularity based on a comparison of the biometric information with threshold biometric information comprising a threshold value associated with normal organ activity corresponding to the user identity. According to an example, such an irregularity can comprise an abnormal eye movement (e.g., twitching, rapid movement or blinking, or another abnormal eye movement). Thus, in response to the biometric information being determined to comprise the irregularity (e.g., by the biometric component 304 and/or determination component 110), the biometric component 304 can cause the AR component 112 to discontinue display of virtual frames in the augmented reality equipment.

Figure 4:
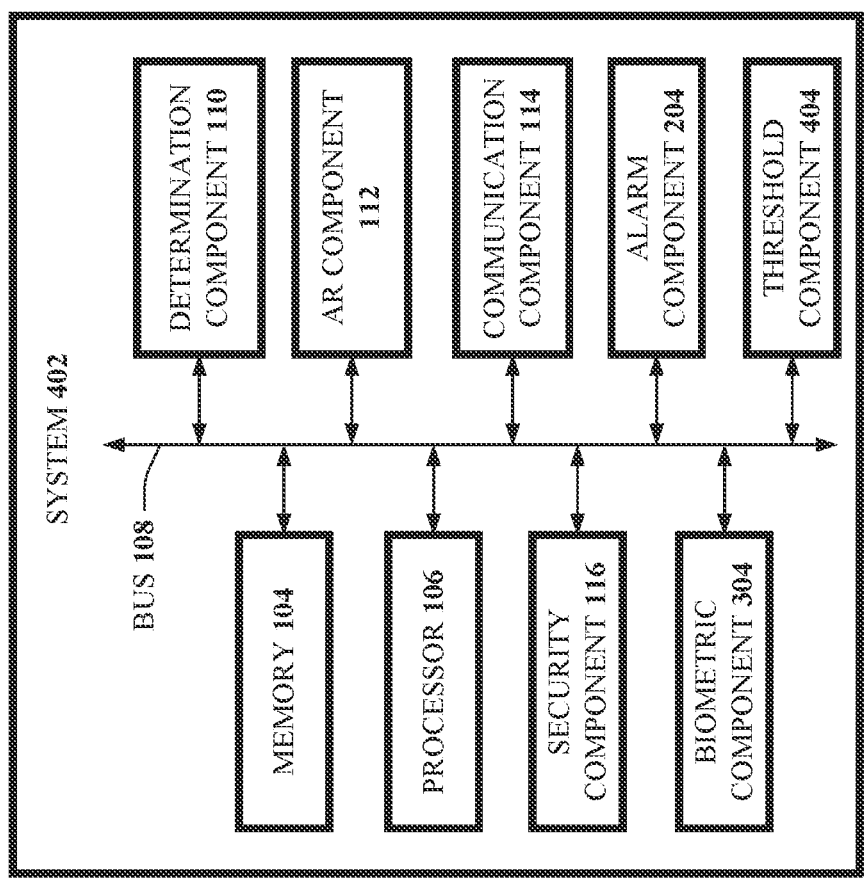
FIG. 4 is a block diagram of an exemplary system in accordance with one or more embodiments described herein.

Turning now to FIG. 4, there is illustrated an example, non-limiting system 402 in accordance with one or more embodiments herein. System 402 can be configured to perform various operations relating to augmented reality security. The system 402 can be similar to system 302, and can comprise one or more of a variety of components, such as memory 104, processor 106, bus 108, determination component 110, AR component 112, communication component 114, security component 116, alarm component 204, and/or biometric component 304. The system 402 can additionally comprise a threshold component 404.

In various embodiments, one or more of the memory 104, processor 106, bus 108, determination component 110, AR component 112, communication component 114, security component 116, alarm component 204, biometric component 304, and/or threshold component 404 can be communicatively or operably coupled (e.g., over a bus or wireless network) to one another to perform one or more functions of the system 402.

According to an embodiment, the threshold component 404 can determine a critical activity associated with a use of the augmented reality equipment. It is noted that the critical activity can be determined (e.g., by the threshold component 404 or determination component 110) to threshold satisfy an activity criterion. Such an activity criterion can be determined using machine learning (e.g., using ML component 504) based on previous activities of previous data from prior to accessing the biometric information (e.g., stored in memory 104). In response to determining the critical activity, the threshold component 404 can modify the threshold biometric information during the critical activity. According to an example, a critical activity associated with a surgery can be representative of a dangerous portion of the surgery. As would be expected, some biofeedback of a user can naturally vary during such a dangerous portion. Thus, the threshold component 404 can modify the threshold biometric information during such a critical activity to avoid triggering a false alarm (e.g., by the alarm component 204). After completion of the critical activity, the threshold component 404 can return the threshold biometric information to a normal threshold level. In this regard, modifying the threshold biometric information can comprise increasing the threshold value associated with normal organ activity corresponding to the user identity, resulting in an increased threshold value that is beyond a range of values applicable to the normal organ activity corresponding to the user identity.

Figure 5:
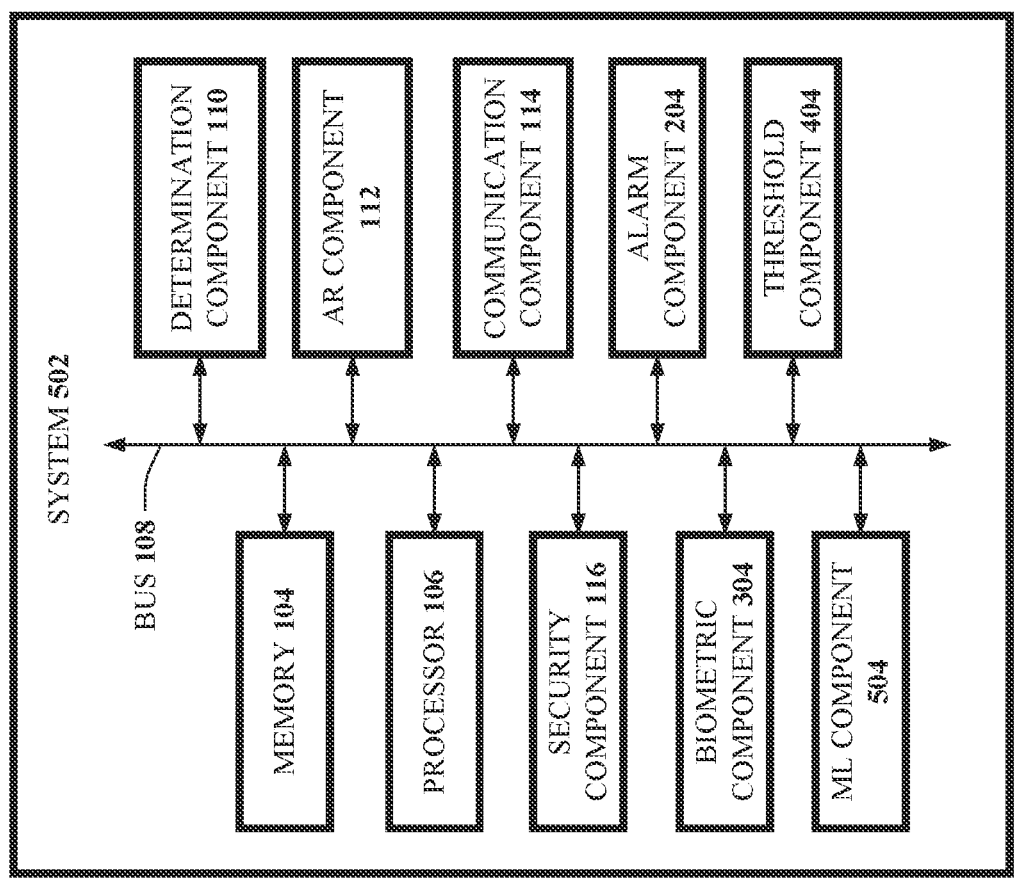
FIG. 5 is a block diagram of an exemplary system in accordance with one or more embodiments described herein.

Turning now to FIG. 5, there is illustrated an example, non-limiting system 502 in accordance with one or more embodiments herein. System 502 can be configured to perform various operations relating to augmented reality security. The system 502 can be similar to system 402, and can comprise one or more of a variety of components, such as memory 104, processor 106, bus 108, determination component 110, AR component 112, communication component 114, security component 116, alarm component 204, biometric component 304, and/or threshold component 404. The system 502 can additionally comprise an ML component 504.

In various embodiments, one or more of the memory 104, processor 106, bus 108, determination component 110, AR component 112, communication component 114, security component 116, alarm component 204, biometric component 304, threshold component 404, and/or ML component 504 can be communicatively or operably coupled (e.g., over a bus or wireless network) to one another to perform one or more functions of the system 502.

The ML component 504 can, for instance, utilize machine learning/artificial intelligence to determine various thresholds herein based on previous activity of previous data. For instance, the ML component 504 can determine an activity criterion determined using machine learning based on previous activities of previous data from prior to accessing biometric information (e.g., by the biometric component 304). The ML component 504 can additionally determine normal organ activity corresponding to a user identity using machine learning based on previous organ activity of previous data associated with the user identity from prior to accessing the biometric information (e.g., by the biometric component 304. Likewise, the ML component 504 can utilize machine learning based on previous analysis of previous virtual frames from prior to receiving a virtual frame in order to establish a defined tampering criterion. Such a defined tampering criterion can be utilized to determine whether the virtual frame has been modified without authorization (e.g., using the determination component 110).

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (AI) model and/or machine learning (ML) or a machine learning model that can learn to perform the above or below described functions (e.g., via training using historical training data and/or feedback data).

In some embodiments, ML component 504 can comprise an AI and/or ML model that can be trained (e.g., via supervised and/or unsupervised techniques) to perform the above or below-described functions using historical training data comprising various context conditions that correspond to various augmented reality security operations. In this example, such an AI and/or ML model can further learn (e.g., via supervised and/or unsupervised techniques) to perform the above or below-described functions using training data comprising feedback data, where such feedback data can be collected and/or stored (e.g., in memory) by the ML component 504. In this example, such feedback data can comprise the various instructions described above/below that can be input, for instance, to a system herein, over time in response to observed/stored context-based information.

AI/ML components herein can initiate an operation(s) associated with a based on a defined level of confidence determined using information (e.g., feedback data). For example, based on learning to perform such functions described above using feedback data, performance information, and/or past performance information herein, a ML component 504 herein can initiate an operation associated with determining various thresholds herein.

In an embodiment, the ML component 504 can perform a utility-based analysis that factors cost of initiating the above-described operations versus benefit. In this embodiment, the ML component 504 can use one or more additional context conditions to determine various thresholds herein.

To facilitate the above-described functions, a ML component 504 herein can perform classifications, correlations, inferences, and/or expressions associated with principles of artificial intelligence. For instance, the ML component 504 can employ an automatic classification system and/or an automatic classification. In one example, the ML component 504 can employ a probabilistic and/or statistical-based analysis (e.g., factoring into the analysis utilities and costs) to learn and/or generate inferences. The ML component 504 can employ any suitable machine-learning based techniques, statistical-based techniques and/or probabilistic-based techniques. For example, the ML component 504 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 504 can perform a set of machine-learning computations. For instance, the ML component 504 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 6:
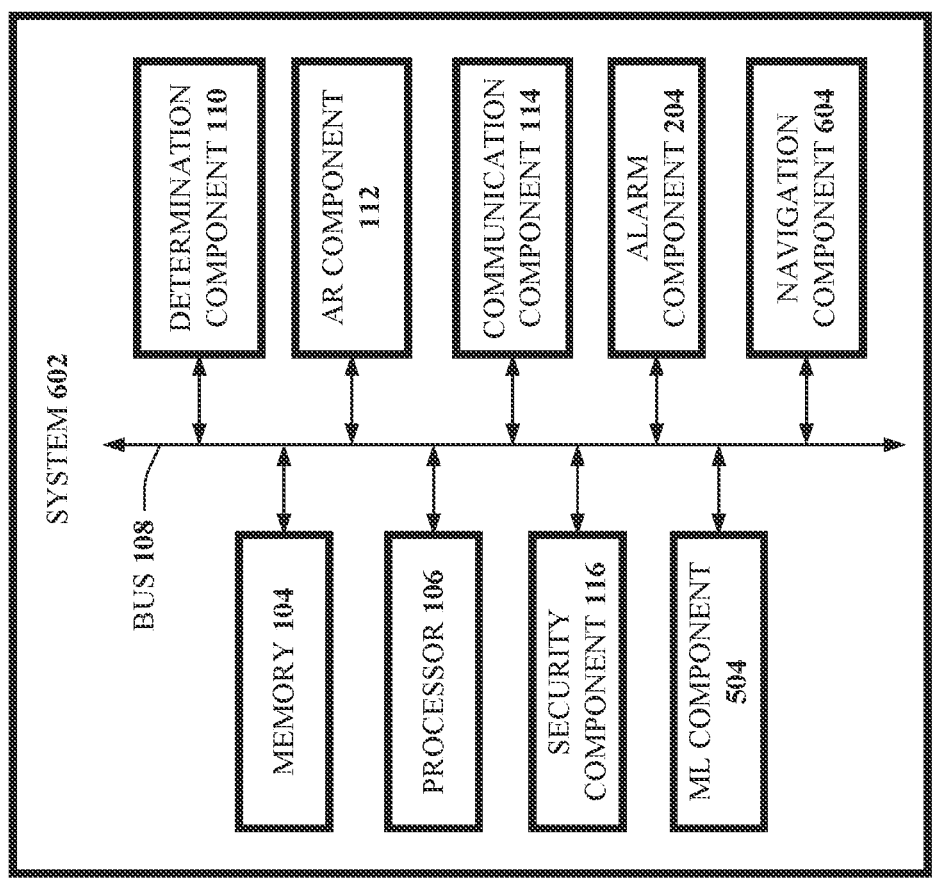
FIG. 6 is a block diagram of an exemplary system in accordance with one or more embodiments described herein.

Turning now to FIG. 6, there is illustrated an example, non-limiting system 602 in accordance with one or more embodiments herein. System 602 can be configured to perform various operations relating to augmented reality security. The system 602 can be similar to system 202, and can comprise one or more of a variety of components, such as memory 104, processor 106, bus 108, determination component 110, AR component 112, communication component 114, and/or security component 116. The system 602 can additionally comprise ML component 504 and a navigation component 604.

In various embodiments, one or more of the memory 104, processor 106, bus 108, determination component 110, AR component 112, communication component 114, security component 116, alarm component 204, ML component 504, and/or navigation component 604 can be communicatively or operably coupled (e.g., over a bus or wireless network) to one another to perform one or more functions of the system 602.

According to an embodiment, the navigation component 604 can generate routing information comprising routing instructions associated with a vehicle comprising a system 602 or communicatively coupled to a system 602. In this regard, a virtual frame herein can comprise a vehicle routing instruction that, when rendered, indicates a routing suggestion to alter a current route (e.g., using the navigation component 604) associated with a vehicle associated with the augmented reality equipment. Further in this regard, augmented reality equipment herein (e.g., AR component 112 and/or augmented reality equipment 704) can comprise automotive augmented reality equipment, and the defined tampering criterion herein can be associated with a vehicle navigation operation. It is noted that the defined tampering criterion can be satisfied in response to a virtual frame being determined (e.g., using the determination component 110) not to threshold match a non-virtual frame corresponding to the virtual frame. Such matches can be associated with hashing of the frames (e.g., by the security component 116) not threshold matching an expected result (based on such hashing).

Figure 7:
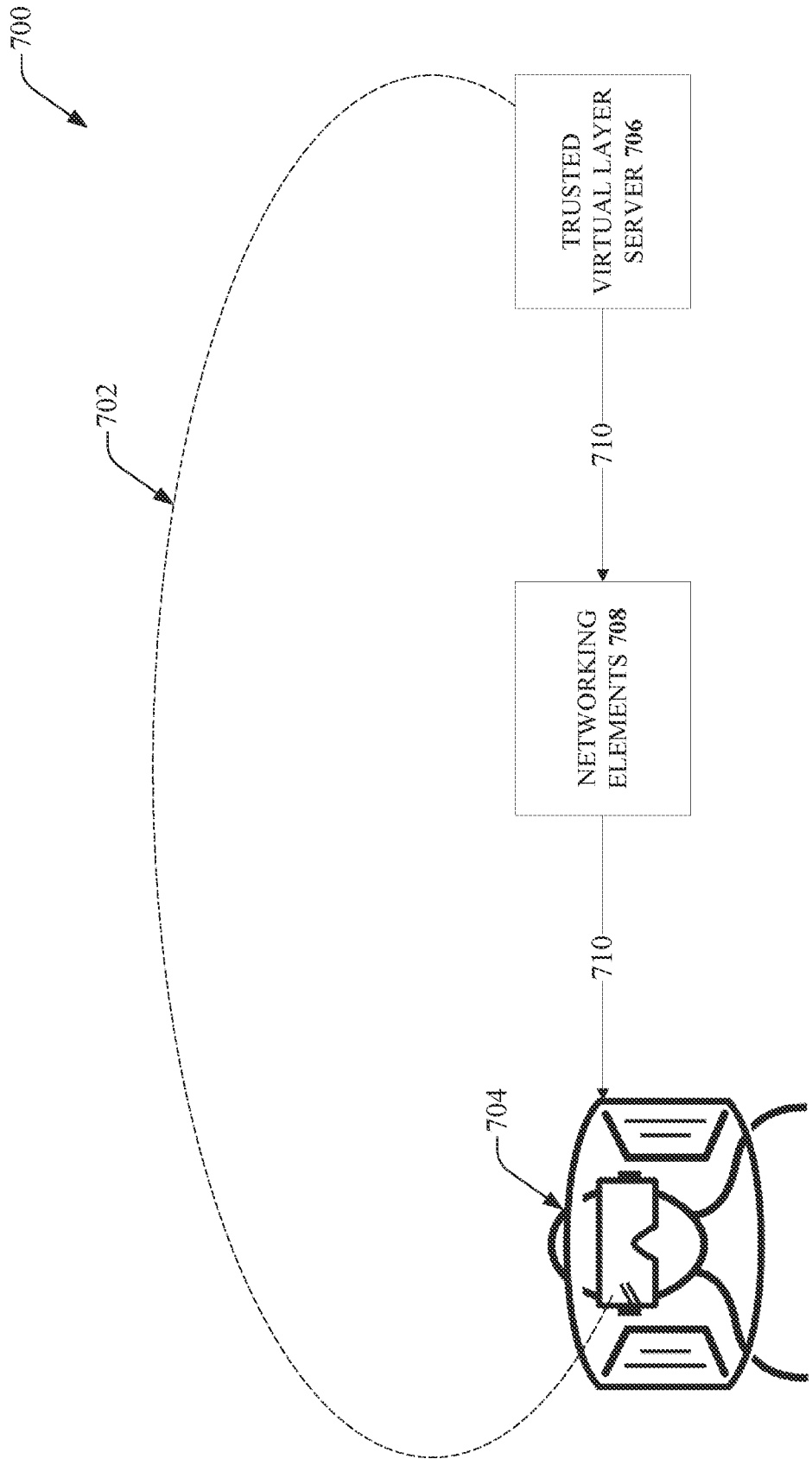
FIG. 7 is a block diagram of an exemplary environment in accordance with one or more embodiments described herein.

FIG. 7 depicts exemplary communication 700 in accordance with one or more embodiments described herein. According to an embodiment, the communication link 702 can comprise a first communication link for security checks (e.g., a light wireless connection) and the communication link 710 can comprise a second communication link utilizing a wireless connection for virtual layer feeds (e.g., high-capacity communication). The trusted virtual layer server 706 can directly communicate over both communication links 710 and 702, for instance, with the augmented reality equipment 704. In an embodiment, the communication link 710 can be transmitted through networking elements 708, which can comprise a router, transceiver, cellular link, switch, gateway, or other suitable networking equipment. Such communications links 702 and/or 710 can utilize, for instance, infrared ("IR"), shortwave transmission, near-field communication ("NFC"), Bluetooth, Wi-Fi, long-term evolution ("LTE"), 3G, 4G, 5G, global system for mobile communications ("GSM"), code-division multiple access ("CDMA"), satellite, visual cues, radio waves, etc. Such communication links can be facilitated by a communication component 114. It is noted that such dual communication herein can significantly increase security (e.g., for use of augmented reality equipment 704) (e.g., by preventing a "man in the middle" attack).

According to an embodiment, augmented reality equipment herein (e.g., augmented reality equipment 704) can comprise displays, eyeglasses, goggles, helmets, heads-up-displays (HUDs), contact lenses, virtual retinal displays, EyeTap, handhelds, projection mapping, audio equipment, or other suitable augmented reality hardware.

According to an embodiment, the augmented reality equipment 704 can comprise medical augmented reality equipment. In such embodiments, a defined tampering criterion herein can be associated with a clinical operation and is satisfied in response to the virtual frame being determined to comprise a threshold similarity to a tampered virtual frame based on the previous analysis of the previous virtual frames using a defined similarity function. Further in this regard, a group of virtual frames herein can comprise virtual layers associated with the clinical operation, and the clinical operation cam comprise a surgical operation. It is noted that, in such embodiments, a defined tampering criterion herein can comprise an organ type criterion associated with a clinical operation, and the defined tampering criterion can be satisfied in response to the virtual frame being determined to comprise an organ depiction corresponding to an organ. In this regard, the organ depiction can be determined not to threshold match the organ according to an organ matching metric. Such an organ matching metric can be generated, for instance, by the ML component 504. In other embodiments, the organ matching metric can be defined, and can be based on organ shape similarly, organ color similarity, organ movement similarity, organ location similarity, or other suitable criteria for organ matching.

In some embodiments, the augmented reality equipment 704 can comprise surgical augmented equipment associated with supplementing rendering of a surgical environment with augmented surgical information. For example, when a surgeon is performing kidney surgery, augmented reality equipment (e.g., augmented reality equipment 704) can generate an overlay providing instructions regarding locations to cut. The foregoing can be applicable in countless other environments too (e.g., a carpenter cutting wood, a fabricator welding metal, an electrician making electrical connections, and so on).

In another embodiment, the augmented reality equipment 704 can comprise automotive augmented reality equipment. In such embodiments, a defined tampering criterion herein can be associated with a vehicle navigation operation, and the defined tampering criterion can be satisfied in response to the virtual frame being determined not to threshold match a non-virtual frame corresponding to the virtual frame. It is noted that in such embodiments, the virtual frame herein can comprise a vehicle routing instruction that, when rendered, indicates a routing suggestion to alter a current route associated with a vehicle associated with the augmented reality equipment 704. For instance, virtual signs or navigational instructions can be rendered on a windshield of a vehicle.

It is noted that communication links herein (e.g., communication link 702 and/or communication link 710) can utilize hashed information (e.g., as hashed by as security component 116). It is further noted that the communication link 710 (or the communication link 702) can comprise a VPN connection.

According to an embodiment, the communication link 702 can comprise a first optical wavelength, and the communication link 710 can comprise a second optical wavelength different from the first optical wavelength. The foregoing can improve the security of such transmission of AR frames (e.g., by preventing a "man in the middle" attack).

In yet another embodiment, the communication link 702 can comprise a first channel in a frequency division multiplexing communication link and the communication link 710 can comprise a second channel in the frequency division multiplexing communication link.

Figure 8:
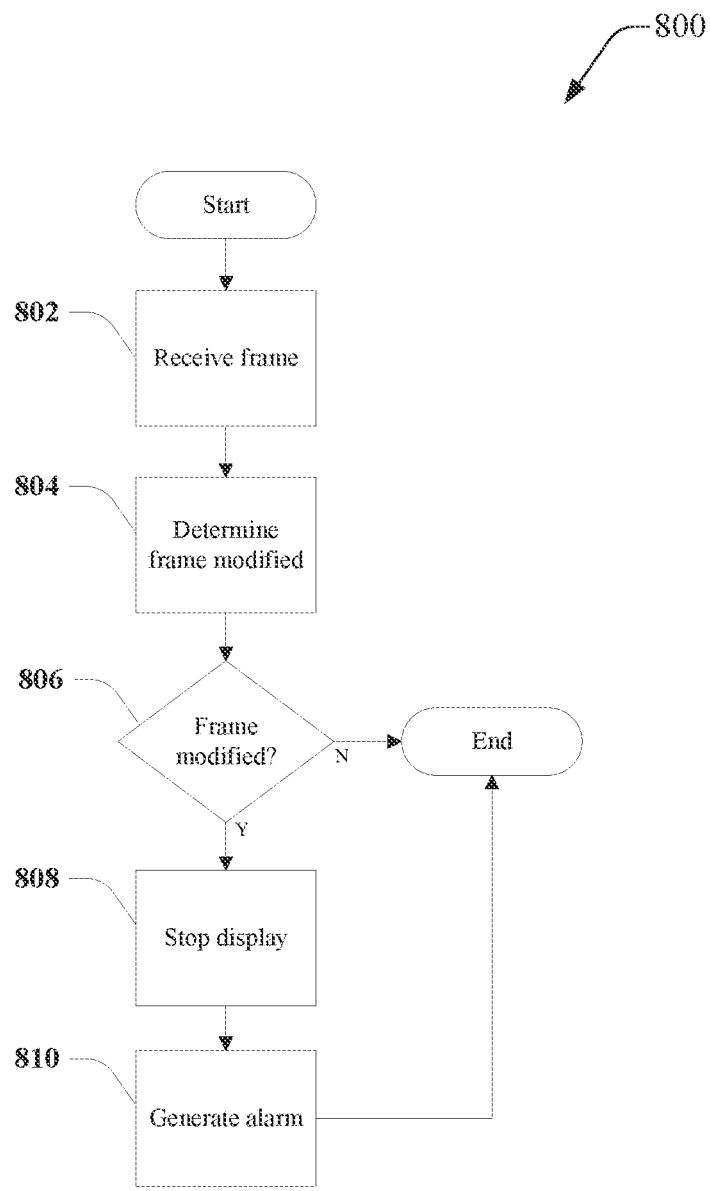
FIG. 8 is a flowchart for a method that facilitates exemplary augmented reality security in accordance with one or more embodiments described herein.

Turning now to FIG. 8, there is illustrated a flow chart of a process 800 for augmented reality security in accordance with one or more embodiments described herein. At 802, a frame can be received (e.g., using a communication component 114). At 804, a determination can be made regarding whether the frame has been modified (e.g., using the determination component 110). At 806, if the frame is determined not to have been modified (e.g., using the determination component 110), the process can end. If at 806, the frame is determined to be modified (e.g., using the determination component 110), the process 800 can proceed to 808. At 808, display of AR content can be terminated (e.g., by an AR component 112). At 810, an alarm signal (e.g., a warning) can be generated (e.g., by an alarm component 204).

Figure 9:
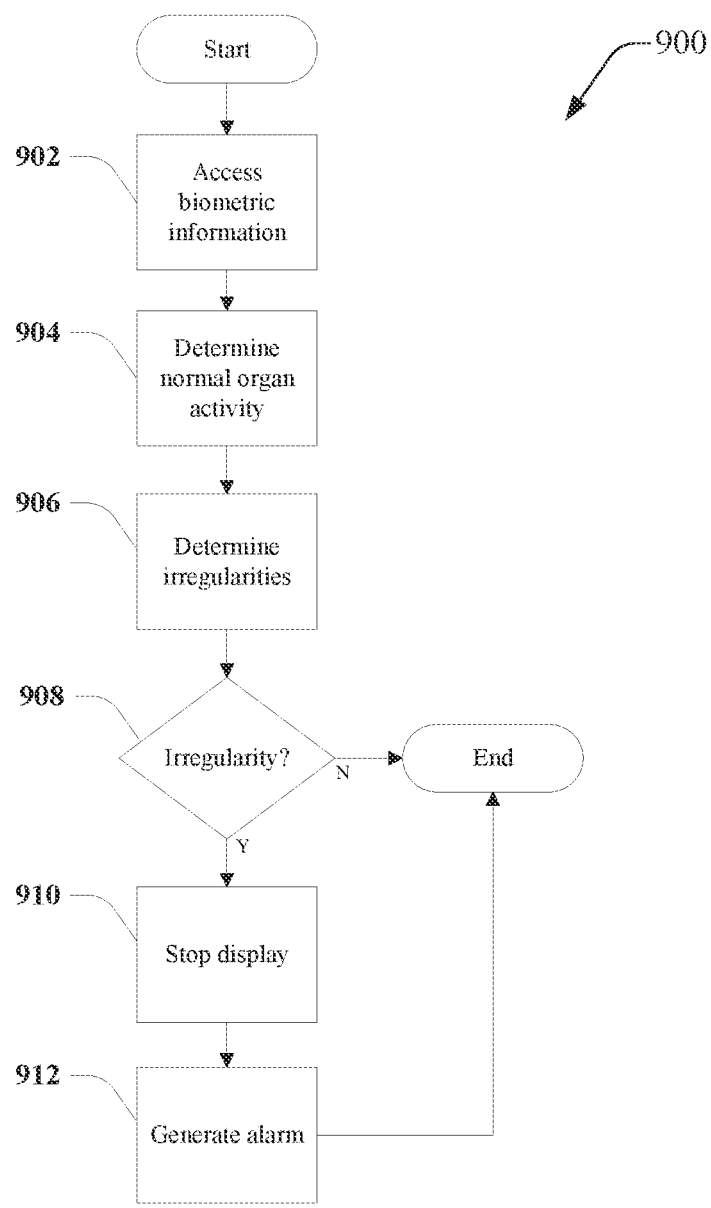
FIG. 9 is a flowchart for a method that facilitates exemplary augmented reality security in accordance with one or more embodiments described herein.

Turning now to FIG. 9, there is illustrated a flow chart of a process 900 for augmented reality security in accordance with one or more embodiments described herein. At 902, biometric information can be accessed (e.g., using a biometric component 304 and/or communication component 114). At 904, normal organ activity can be determined (e.g., for a particular user identity) using, for instance, the ML component 504 or determination component 110. At 906, irregularities in organ activity (e.g., captured using the biometric component 304) can be determined (e.g., using the biometric component 304 and/or determination component 110). At 908, if no irregularity exists, the process can end. If at 908, an irregularity is determined (e.g., using the biometric component 304 and/or determination component 110), the process 900 can proceed to 910. At 910, display of AR content can be terminated (e.g., by an AR component 112). At 912, an alarm signal (e.g., a warning) can be generated (e.g., by an alarm component 204).

Figure 10:
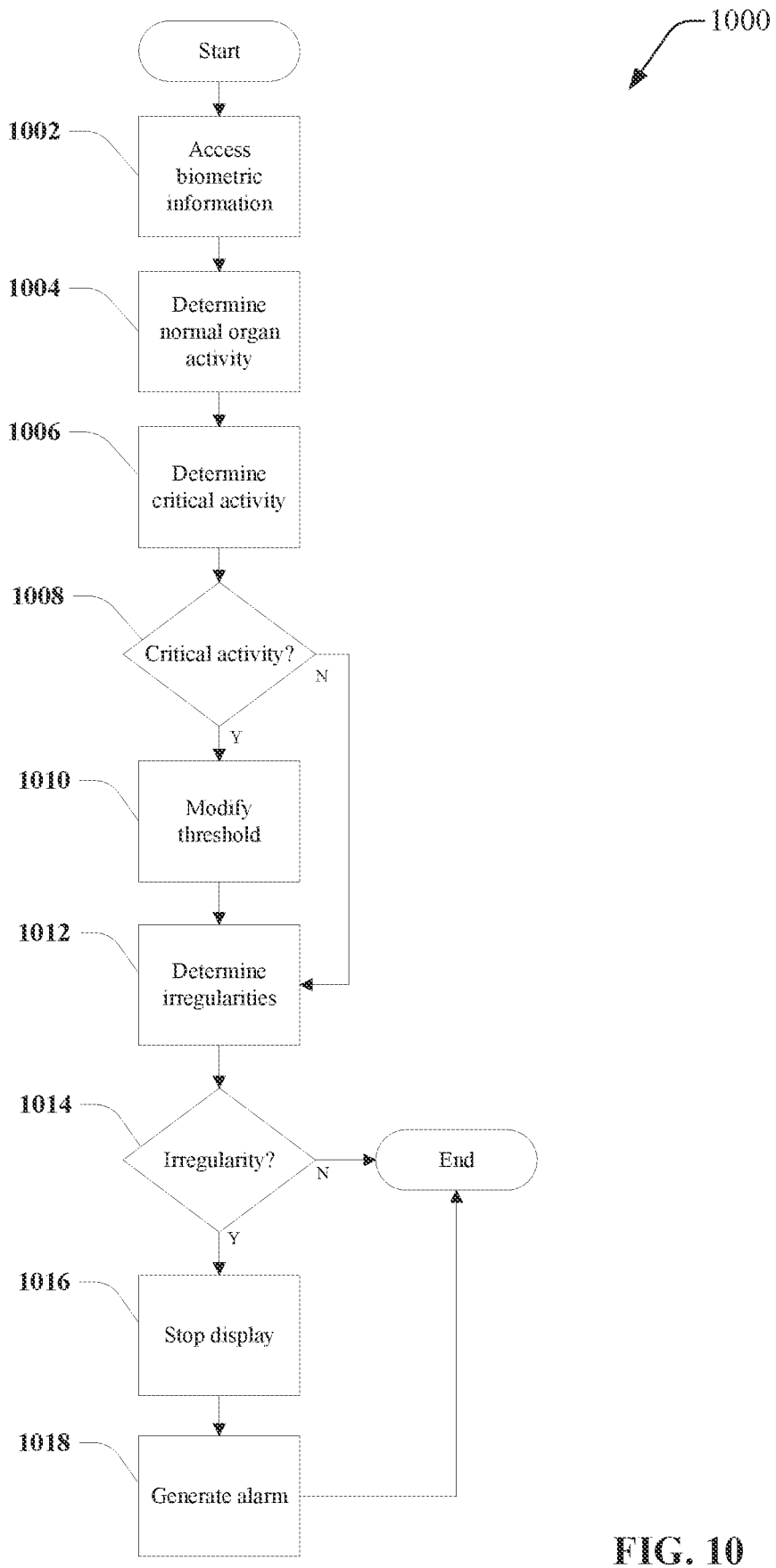
FIG. 10 is a flowchart for a method that facilitates exemplary augmented reality security in accordance with one or more embodiments described herein.

Turning now to FIG. 10, there is illustrated a flow chart of a process 1000 for augmented reality security in accordance with one or more embodiments described herein. At 1002, biometric information can be accessed (e.g., using a biometric component 304 and/or communication component 114). At 1004, normal organ activity can be determined (e.g., for a particular user identity) using, for instance, the ML component 504 or determination component 110. At 1006, a critical activity can be determined (e.g., using the determination component 110). If at 1008, an activity is determined to be critical (e.g., according to an activity criterion), the process 1000 can proceed to 1010. If at 1008, the activity is determined not to be critical (e.g., according to the activity criterion), the process 1000 can proceed to 1012. At 1010, threshold biometric information during the critical activity can be modified (e.g., by the threshold component 404). For example, a critical activity associated with a surgery can be associated with a dangerous portion of the surgery. As would be expected, some biofeedback of some users can naturally vary during this dangerous portion of the surgery. Thus, the threshold component 404 can modify the threshold biometric information during such a critical activity to avoid triggering a false alarm. At 1012, irregularities in organ activity (e.g., captured using the biometric component 304) can be determined (e.g., using the biometric component 304 and/or determination component 110). At 1014, if no irregularity exists, the process 1000 can end. If at 1014, an irregularity is determined (e.g., using the biometric component 304 and/or determination component 110), the process 1000 can proceed to 1016. At 1016, display of AR content can be terminated (e.g., by an AR component 112). At 1018, an alarm signal (e.g., a warning) can be generated (e.g., by an alarm component 204).

Figure 11:
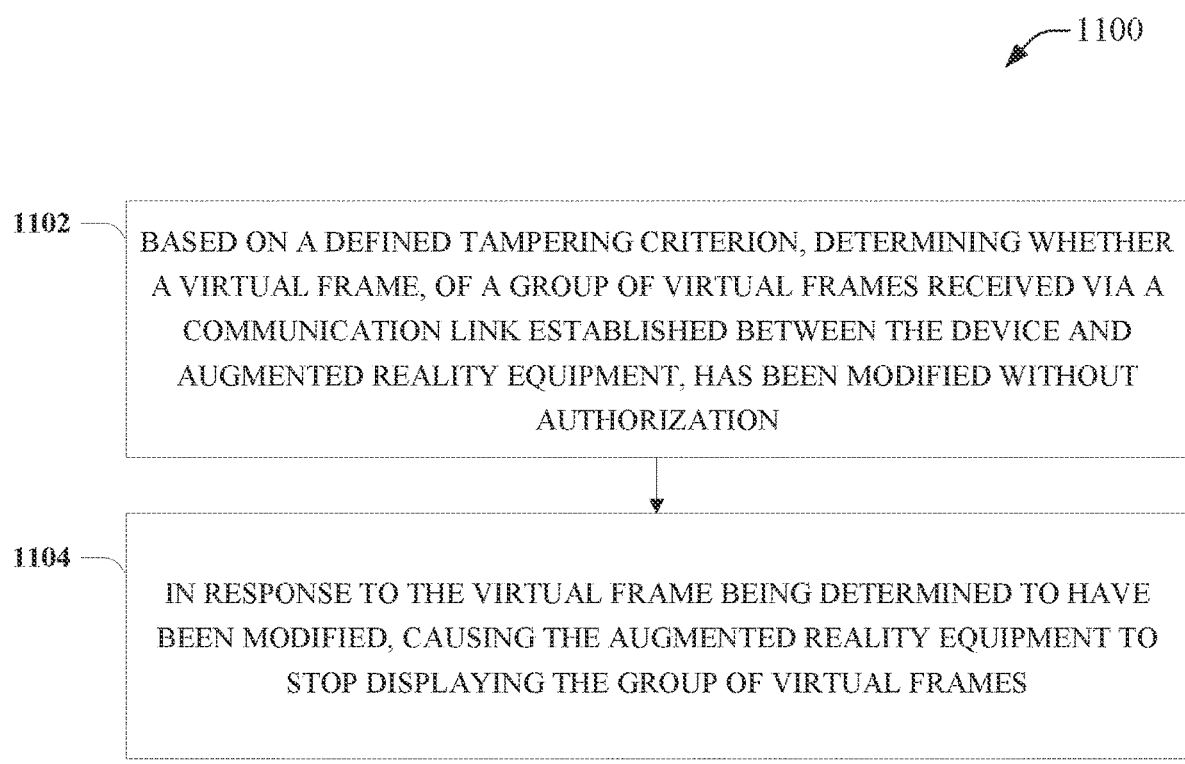
FIG. 11 is a block flow diagram for a process for augmented reality security in accordance with one or more embodiments described herein.

FIG. 11 illustrates a block flow diagram for a process 1100 associated with augmented reality security in accordance with one or more embodiments described herein. At 1102, the process 1100 can comprise: based on a defined tampering criterion, determining whether a virtual frame, of a group of virtual frames received via a communication link established between the device and augmented reality equipment, has been modified without authorization. At 1104, the process 1100 can comprise: in response to the virtual frame being determined to have been modified, causing the augmented reality equipment to stop displaying the group of virtual frames.

Figure 12:
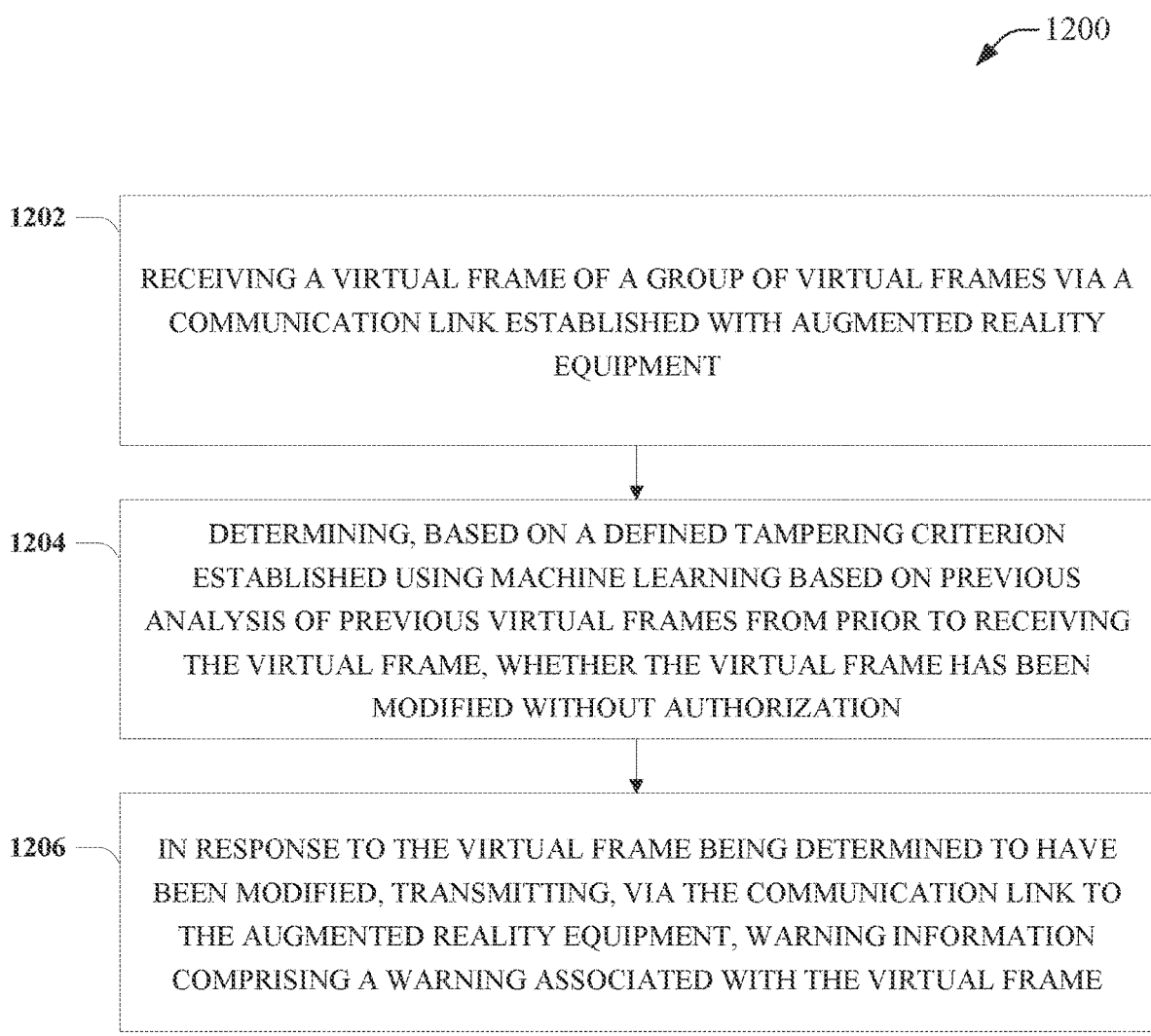
FIG. 12 is a block flow diagram for a process for augmented reality security in accordance with one or more embodiments described herein.

FIG. 12 illustrates a block flow diagram for a process 1200 associated with augmented reality security in accordance with one or more embodiments described herein. At 1202, the process 1200 can comprise: receiving a virtual frame of a group of virtual frames via a communication link established with augmented reality equipment. At 1204, the process 1200 can comprise: determining, based on a defined tampering criterion established using machine learning based on previous analysis of previous virtual frames from prior to receiving the virtual frame, whether the virtual frame has been modified without authorization. At 1206, the process 1200 can comprise: in response to the virtual frame being determined to have been modified, transmitting, via the communication link to the augmented reality equipment, warning information comprising a warning associated with the virtual frame.

Figure 13:
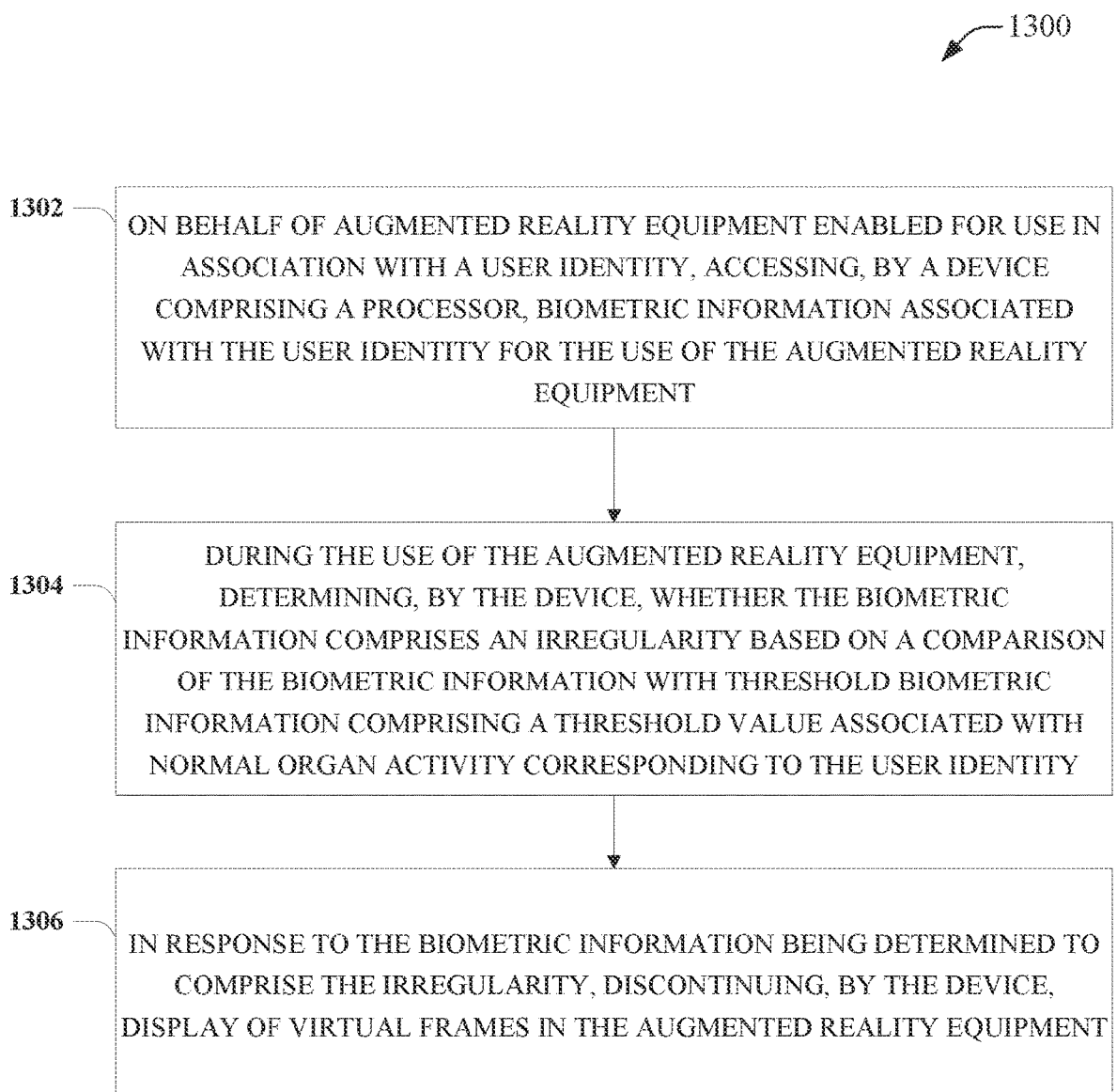
FIG. 13 is a block flow diagram for a process for augmented reality security in accordance with one or more embodiments described herein.

FIG. 13 illustrates a block flow diagram for a process 1300 associated with augmented reality security in accordance with one or more embodiments described herein. At 1302, the process 1300 can comprise: on behalf of augmented reality equipment enabled for use in association with a user identity, accessing, by a device comprising a processor, biometric information associated with the user identity for the use of the augmented reality equipment. At 1304, the process 1300 can comprise: during the use of the augmented reality equipment, determining, by the device, whether the biometric information comprises an irregularity based on a comparison of the biometric information with threshold biometric information comprising a threshold value associated with normal organ activity corresponding to the user identity. At 1306, the process 1300 can comprise: in response to the biometric information being determined to comprise the irregularity, discontinuing, by the device, display of virtual frames in the augmented reality equipment.

Figure 14:
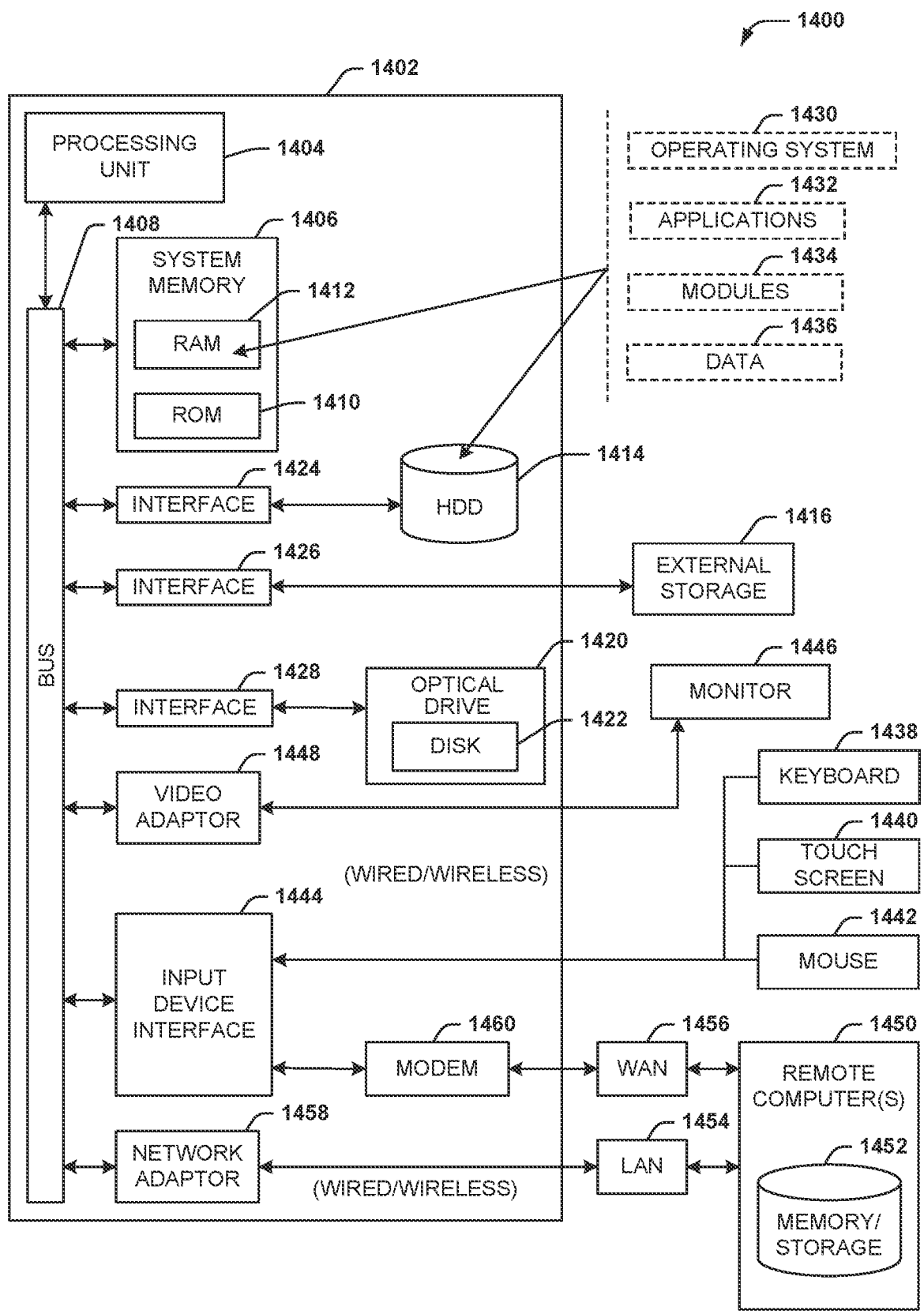
FIG. 14 is an example, non-limiting computing environment in which one or more embodiments described herein can be implemented.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
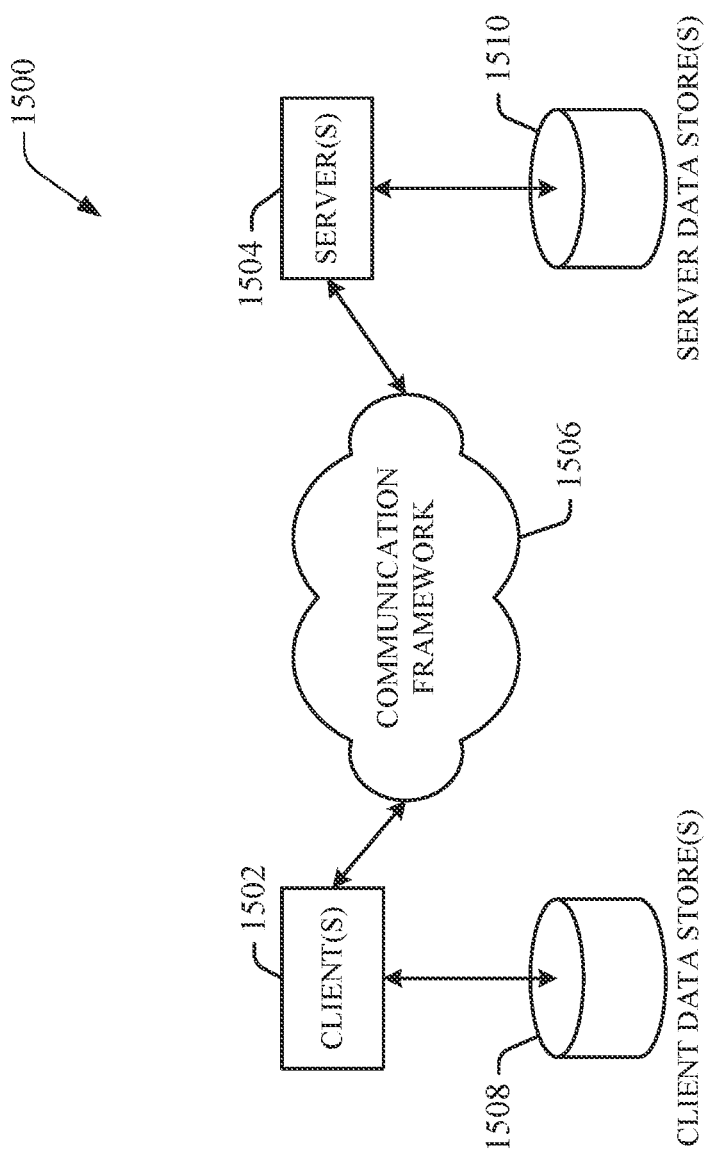
FIG. 15 is an example, non-limiting networking environment in which one or more embodiments described herein can be implemented.

Referring now to FIG. 15, there is illustrated a schematic block diagram of a computing environment 1500 in accordance with this specification. The system 1500 includes one or more client(s) 1502, (e.g., computers, smart phones, tablets, cameras, PDA's). The client(s) 1502 can be hardware and/or software (e.g., threads, processes, computing devices). The client(s) 1502 can house cookie(s) and/or associated contextual information by employing the specification, for example.

The system 1500 also includes one or more server(s) 1504. The server(s) 1504 can also be hardware or hardware in combination with software (e.g., threads, processes, computing devices). The servers 1504 can house threads to perform transformations of media items by employing aspects of this disclosure, for example. One possible communication between a client 1502 and a server 1504 can be in the form of a data packet adapted to be transmitted between two or more computer processes wherein data packets may include coded analyzed headspaces and/or input. The data packet can include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

In one exemplary implementation, a client 1502 can transfer an encoded file, (e.g., encoded media item), to server 1504. Server 1504 can store the file, decode the file, or transmit the file to another client 1502. It is noted that a client 1502 can also transfer uncompressed file to a server 1504 and server 1504 can compress the file and/or transform the file in accordance with this disclosure. Likewise, server 1504 can encode information and transmit the information via communication framework 1506 to one or more clients 1502.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
   a processor; and
   a memory that stores executable instructions that, when executed by the processor, facilitate performance of operations, comprising:
   based on a defined tampering criterion, determining whether a virtual frame, of a group of virtual frames received via a first communication link established between the device and augmented reality equipment, has been modified without authorization; and
   in response to the virtual frame being determined to have been modified, causing the augmented reality equipment to stop displaying the group of virtual frames based on a signal being communicated via a second communication link established between the device and the augmented reality equipment, wherein information represented in the signal comprises hashed information.

2. The device of claim 1, wherein the operations further comprise:
   in response to a determination that the virtual frame has been tampered with based on the defined tampering criterion, generating an alarm signal.

3. The device of claim 1, wherein the defined tampering criterion is evaluated based on a result of a checksum process applied to the virtual frame.

4. The device of claim 1, wherein the second communication link comprises a virtual private network connection.

5. The device of claim 1, wherein the first communication link comprises a first optical wavelength and the second communication link comprises a second optical wavelength different from the first optical wavelength.

6. The device of claim 1, wherein the first communication link comprises a first channel in a frequency division multiplexing communication link and the second communication link comprises a second channel in the frequency division multiplexing communication link.

7. A non-transitory machine-readable medium, comprising executable instructions that, when executed by a processor, facilitate performance of operations, comprising:
   receiving a virtual frame of a group of virtual frames via a communication link established with augmented reality equipment;
   determining, based on a defined tampering criterion established using machine learning based on previous analysis of previous virtual frames from prior to receiving the virtual frame, whether the virtual frame has been modified without authorization; and
   in response to the virtual frame being determined to have been modified, transmitting, via the communication link to the augmented reality equipment, warning information comprising a warning associated with the virtual frame,
   wherein at least one of:
   the augmented reality equipment comprises a medical augmented reality equipment, and wherein the defined tampering criterion is associated with a clinical operation and is satisfied in response to the virtual frame being determined to comprise a threshold similarity to a tampered virtual frame based on the previous analysis of the previous virtual frames using a defined similarity function, or
   the augmented reality equipment comprises an automotive augmented reality equipment, wherein the defined tampering criterion is associated with a vehicle navigation operation, and wherein the defined tampering criterion is satisfied in response to the virtual frame being determined not to threshold match a non-virtual frame corresponding to the virtual frame.

8. The non-transitory machine-readable medium of claim 7, wherein the augmented reality equipment comprises the medical augmented reality equipment, and wherein the defined tampering criterion is associated with the clinical operation and is satisfied in response to the virtual frame being determined to comprise the threshold similarity to the tampered virtual frame based on the previous analysis of the previous virtual frames using a defined similarity function.

9. The non-transitory machine-readable medium of claim 8, wherein the group of virtual frames comprises virtual layers associated with the clinical operation, and wherein the clinical operation comprises a surgical operation.

10. The non-transitory machine-readable medium of claim 8, wherein the defined tampering criterion comprises an organ type criterion associated with the clinical operation, wherein the defined tampering criterion is satisfied in response to the virtual frame being determined to comprise an organ depiction corresponding to an organ, and wherein the organ depiction is determined not to threshold match the organ according to an organ matching metric.

11. The non-transitory machine-readable medium of claim 7, wherein the augmented reality equipment comprises the automotive augmented reality equipment, wherein the defined tampering criterion is associated with the vehicle navigation operation, and wherein the defined tampering criterion is satisfied in response to the virtual frame being determined not to threshold match the non-virtual frame corresponding to the virtual frame.

12. The non-transitory machine-readable medium of claim 11, wherein the virtual frame comprises a vehicle routing instruction that, when rendered, indicates a routing suggestion to alter a current route associated with a vehicle associated with the augmented reality equipment.

13. A method, comprising:
   on behalf of augmented reality equipment enabled for use in association with a user identity, accessing, by a device comprising a processor, biometric information associated with the user identity for the use of the augmented reality equipment;
   during the use of the augmented reality equipment, determining, by the device, whether the biometric information comprises an irregularity based on a comparison of the biometric information with threshold biometric information comprising a threshold value associated with normal organ activity corresponding to the user identity;
   in response to the biometric information being determined to comprise the irregularity, discontinuing, by the device, display of virtual frames in the augmented reality equipment;
   determining, by the device, a critical activity associated with a use of the augmented reality equipment, wherein the critical activity is determined to threshold satisfy an activity criterion, and wherein the activity criterion is determined using machine learning based on previous activities associated with previous data prior to the accessing of the biometric information; and in response to determining the critical activity, modifying, by the device, the threshold biometric information during the critical activity.

14. The method of claim 13, further comprising:

generating, by the device, an alarm signal associated with the irregularity.

15. The method of claim 13, further comprising:

determining, by the device, the normal organ activity corresponding to the user identity using machine learning based on previous organ activity associated with second previous data associated with the user identity from prior to the accessing of the biometric information.

16. The method of claim 13, wherein the augmented reality equipment comprises surgical augmented reality equipment associated with supplementing a rendering of a surgical environment with augmented surgical information.

17. The method of claim 13, wherein the modifying of the threshold biometric information comprises increasing the threshold value associated with normal organ activity corresponding to the user identity, resulting in an increased threshold value that is beyond a range of values applicable to the normal organ activity corresponding to the user identity.

18. The method of claim 13, wherein the critical activity is associated with a surgery.

19. The method of claim 13, wherein the augmented reality equipment comprises eyeglasses, goggles, a helmet, a contact lens, or any combination thereof.

20. The method of claim 13, wherein the irregularity is based on a twitching or a blinking of an eye.

* * * * *